June 4, 1935.  H. N. OTT  2,003,387
MICROSCOPE
Filed May 1, 1931  5 Sheets-Sheet 1
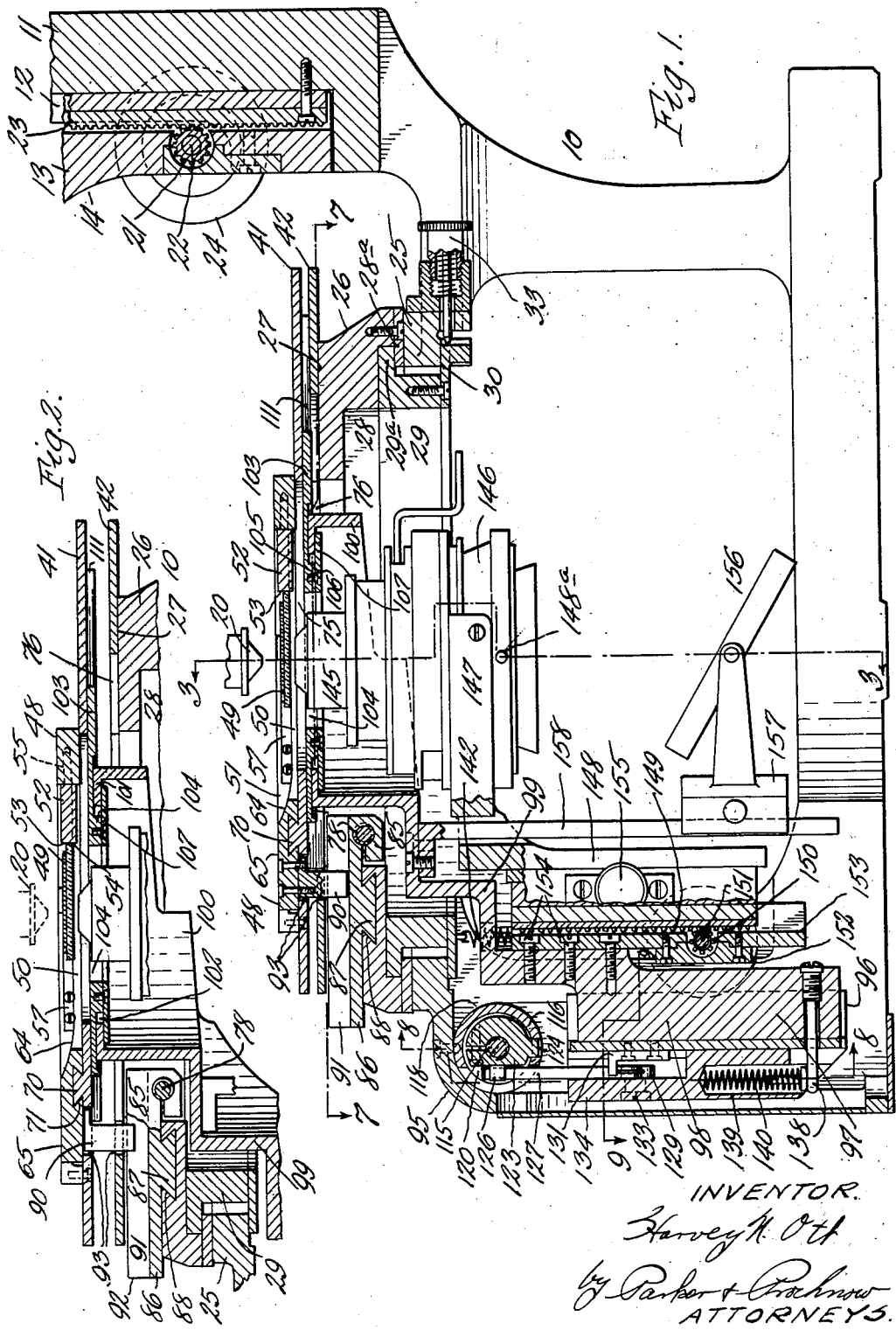

June 4, 1935.  H. N. OTT  2,003,387
MICROSCOPE
Filed May 1, 1931  5 Sheets-Sheet 2

INVENTOR.
Harvey N. Ott
by Parker & Prochnow
ATTORNEYS.

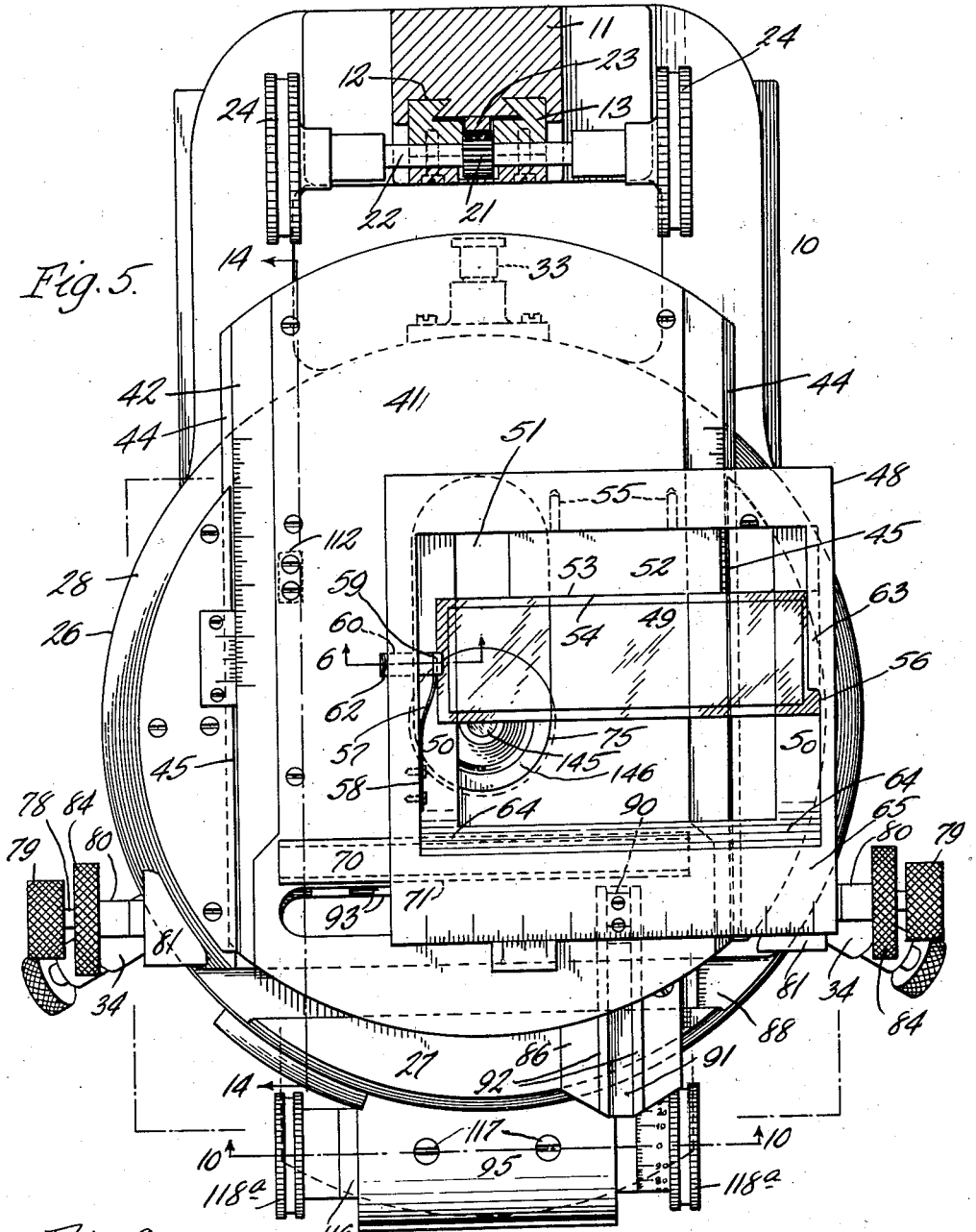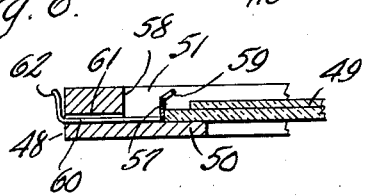

June 4, 1935.  H. N. OTT  2,003,387
MICROSCOPE
Filed May 1, 1931   5 Sheets-Sheet 4
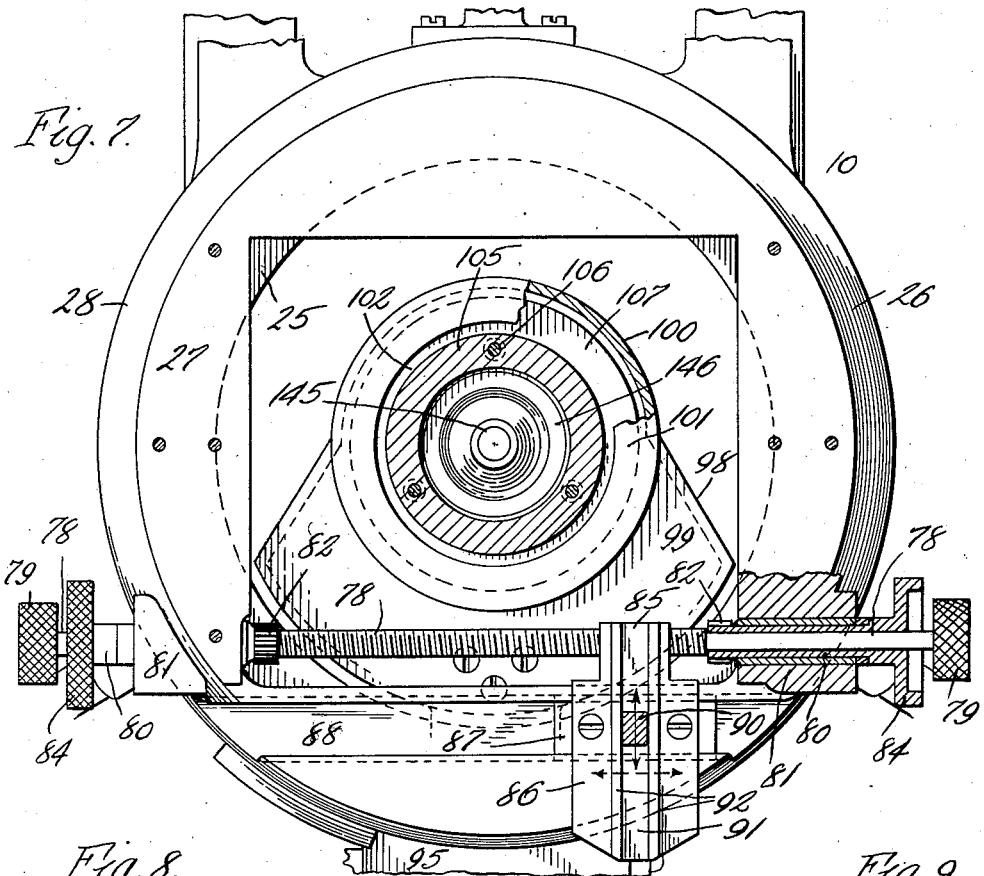
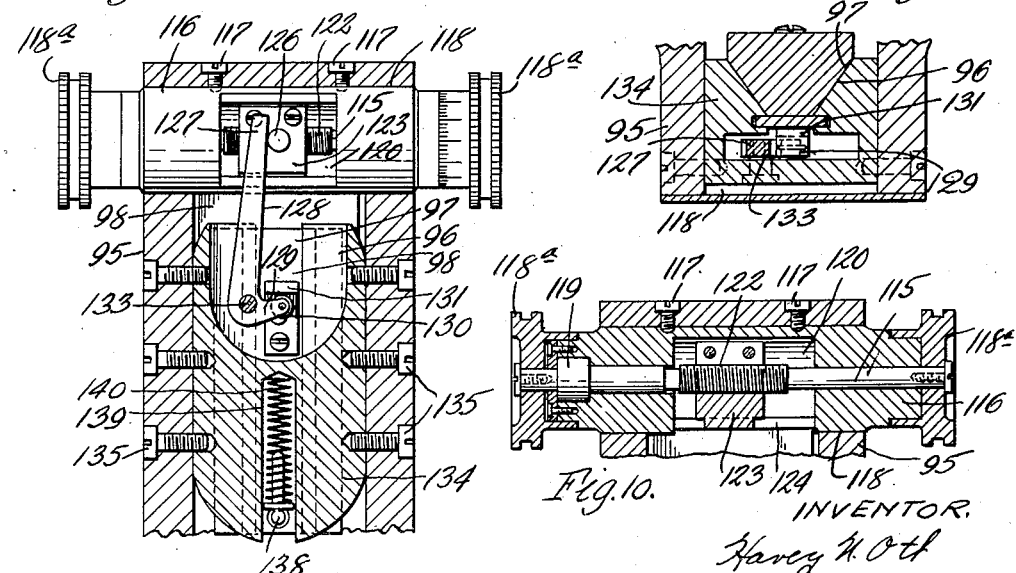
INVENTOR.
Harvey N. Ott
by Parker & Brahnow
ATTORNEYS.

June 4, 1935.  H. N. OTT  2,003,387
MICROSCOPE
Filed May 1, 1931   5 Sheets-Sheet 5
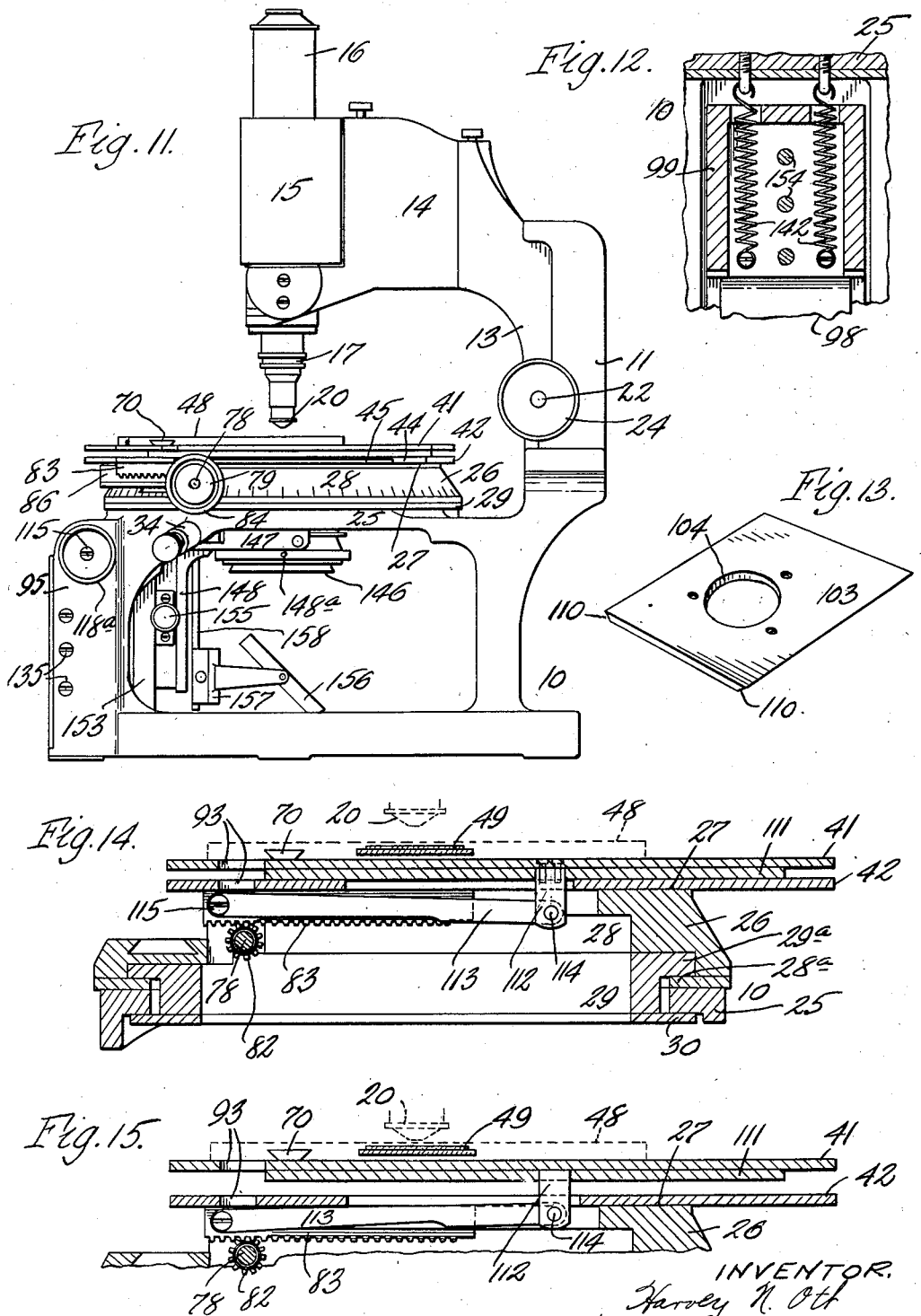

Patented June 4, 1935

2,003,387

UNITED STATES PATENT OFFICE 2,003,387

MICROSCOPE

Harvey N. Ott, Buffalo, N. Y., assignor to Spencer Lens Company, Buffalo, N. Y.

Application May 1, 1931, Serial No. 534,228

14 Claims. (Cl. 88—39)

This invention relates to improvements in microscopes.

Microscopes are usually provided with a coarse adjusting mechanism and fine adjusting mechanism both arranged so as to actuate the body tube, with the eye piece and objective mounted thereon lengthwise of the axis of the objective for moving the latter toward and from the specimen slide or other object upon the stage of the instrument. Thus, both adjusting mechanisms are disposed in such relation to the other parts of the instrument as to place them at a considerable distance above the surface upon which the microscope rests. The user, therefore, can not rest his hands upon said surface and, consequently, can not exercise steady control over the adjustments when manipulating the knobs or buttons of the adjusting mechanisms.

An object of this invention is to construct a microscope having a fine adjusting mechanism, the operating knobs or buttons of which are located relatively low and in a convenient position to enable the user to rest his hands upon the supporting surface, thereby insuring a very steady control of the mechanism when making fine adjustments.

It is usual in microscopes to adjust the objective to place it in operative relation to a specimen on the stage, first by a preliminary coarse adjustment and then by a fine adjustment of said objective. It is also usual to mount the condenser of the instrument upon a sub-stage below the slide or object and to adjust the sub-stage so as to move the condenser lengthwise of the optical axis to position said condenser in operative relation to the relatively stationary specimen.

Other objects of the invention are to construct a microscope having a coarse adjusting mechanism for moving the objective towards and from the specimen, and to provide a fine adjusting mechanism for shifting the specimen toward and from said objective to different positions in a novel manner; also to construct a microscope having a stage which, in addition to providing the usual longitudinal and transverse movements of the specimen slide, is also movable by the actuation of said fine adjustment mechanism for adjusting said slide towards and from said objective; also to construct a microscope in which the sub-stage is also adjusted by said actuation of the fine adjusting mechanism, whereby the adjustment or relation of the condenser to the specimen or slide is retained during the adjustment of said slide towards and from the objective.

Further objects of the invention are to construct a microscope having an improved slide holder for supporting a specimen slide in a desired position on the instrument; and also to improve microscopes in the various respects hereinafter set forth and claimed.

In the drawings:

Fig. 1 is a longitudinal, vertical section of my improved microscope, with the body tube and a part of the arm of the instrument omitted.

Fig. 2 is a fragmentary similar view showing some of the parts in a different position.

Fig. 5 is a plan view thereof, showing the arm of the instrument in section.

Fig. 6 is a fragmentary cross section of a portion of the specimen or slide holder of the instrument, on line 6—6 of Fig. 5.

Fig. 7 is a fragmentary, horizontal section of the microscope, taken approximately on the line 7—7 of Fig. 1.

Fig. 8 is a vertical transverse section of the fine adjustment mechanism and the associated parts of the instrument, taken on line 8—8, Fig. 1.

Fig. 9 is a fragmentary, horizontal section thereof, on line 9—9, Fig. 1.

Fig. 10 is a vertical section thereof, on line 10—10, Fig. 5.

Fig. 11 is a side elevation of the instrument, on a reduced scale.

Fig. 12 is a fragmentary, vertical section showing resilient, supporting means for the secondary stage support arranged between the latter and the base of the instrument.

Fig. 13 is a perspective view of a floating bearing plate interposed between the stage and the secondary stage support.

Figs. 14 and 15 are longitudinal, vertical sections on line 14—14, Fig. 5 showing parts of the stage in two different positions.

Figure 3:
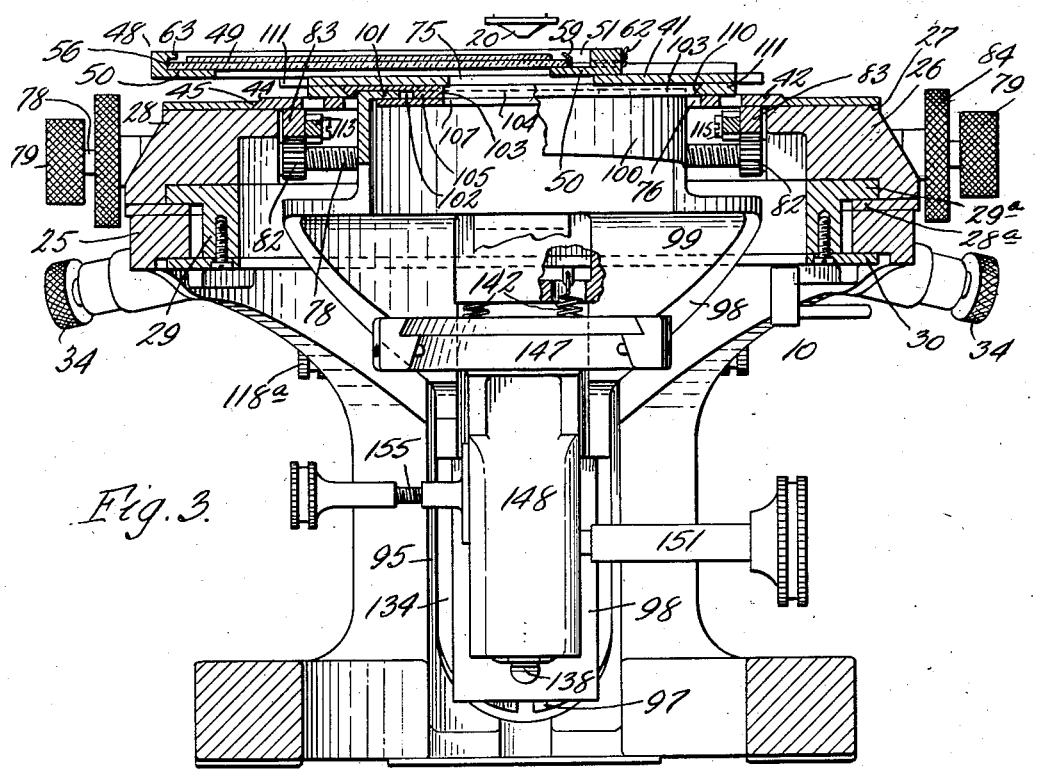
Fig. 3 is a vertical, transverse section of the instrument, taken on the line 3—3 of Fig. 1.
Figure 4:
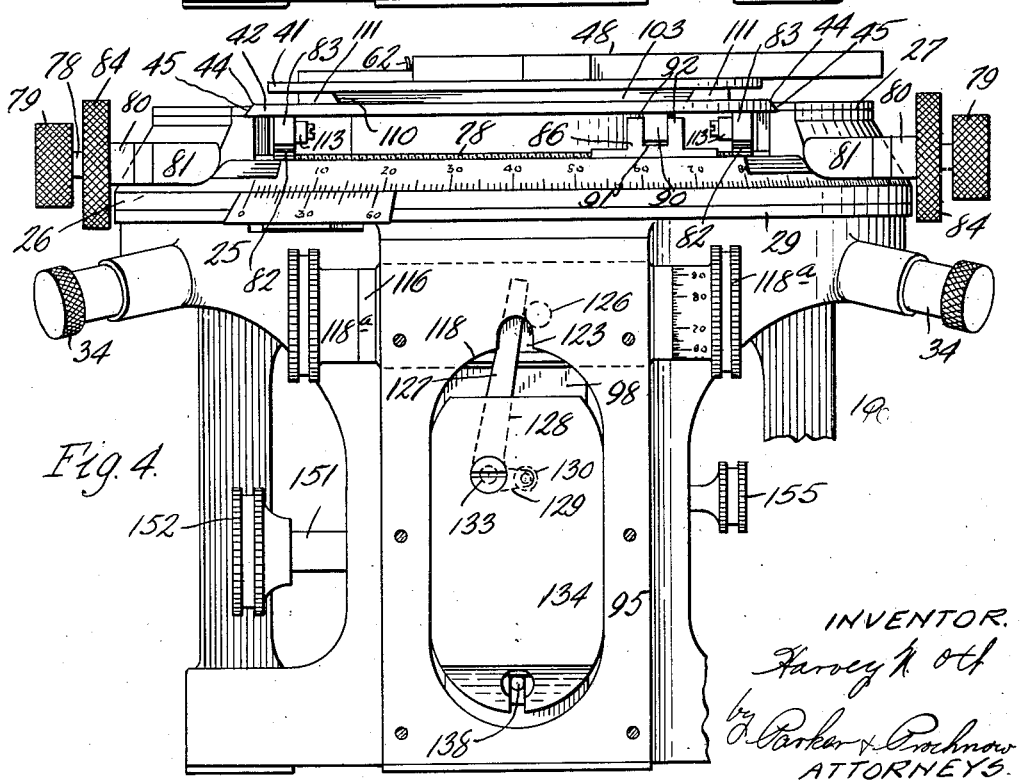
Fig. 4 is a front view of the base and stage of the microscope.

The invention is applicable to various forms of compound microscopes.

The microscope shown in the drawings for illustrating an embodiment of my invention, is provided with a base structure 10, an arm or upright 11, extending upwardly from the rear end thereof, and which is provided with a vertical guide 12 in which a slide or part 13 of the body tube arm 14 slidably engages to move up and down therein. The arm 14 has secured thereto a body tube 15 having at its upper end the usual eye piece tube 16. The lower end of the body tube 15 is provided with a suitable mounting 17 for the reception of an an objective 20.

The up and down movements of the parts 14 and 15 are effected by a coarse adjustment mechanism including a pinion 21 mounted upon a horizontal operating shaft 22 journaled in the slide 13 of the arm 14. The pinion 21 engages a fixed, vertical rack 23 on the upright 11, and is rotated by knobs 24 fixed to the outer ends of the shaft 22.

The base structure 10 of the microscope, in the construction shown, includes a primary stage support comprising a relatively stationary horizontal frame or ring 25, and also, if desired, a decentering ring or member 26 upon the top horizontal face 27 of which a part of the stage of the instrument operatively engages. When no decentering ring is used, said stage part would engage the stationary frame 25 directly. The ring 26 is adjustable radially or laterally relatively to the frame 25. For this purpose said ring 26 is made in two parts 28 and 29, having interlocking annular shoulders 28ª and 29ª which permit the former to rotate relatively to the latter. A face of the shoulder 28ª engages the top face of the frame 25, and an annular shoulder 30 on the part 29 engages the bottom face of said frame, thereby retaining the parts of the structure in operative relation.

Clearance is provided between the frame 25 and decentering ring 26, as shown in Fig. 1, so that said ring can be adjusted laterally. Suitable means are provided for adjusting and holding the ring in position, such as the adjusting screws 33 and 34 mounted upon the frame 25 in a manner to permit the inner ends of the screws to bear against a portion of the decentering ring part 29. One of the screws enters a groove in said part to prevent rotation of said part, so that the upper part 28 alone can turn relatively to said frame 25, whereby the stage can be rotated to different angular positions with respect to the base structure 10.

The stage of the microscope, in the construction illustrated, includes a pair of superimposed horizontal plates or members 41 and 42, the latter of which, in the construction illustrated, rests upon said face 27 of the primary support and is movably connected thereto for adjustment lengthwise of the instrument, being provided for this purpose with bevelled edges 44 which engage in undercut guide ways 45 formed on or secured to said face 27. The plate 41 is operatively connected to the plate 42 so as to move therewith in the lateral adjustment thereof, as will be described.

Superimposed upon the plate 41 is a holder 48 for operatively supporting a specimen, slide or the like object 49. This holder 48 preferably comprises a rectangular plate or frame, having an aperture 51 therein. At two opposite sides of the aperture the holder is provided with horizontal ledges 50 upon which the opposite ends of the slide 49 may rest, as shown in Fig. 5.

The holder 48 is provided at one end with an abutment 52 which is, preferably, in the form of a block having a transverse vertical stop face 53 against which one of the side edges 54 of the slide 49 engages when in operative position. If desired, the abutment 52 can be removably secured to the holder 48 as by means of pins 55 which fit in holes in the adjacent part of the holder 48. By making the abutment or block 52 removable, slides of different widths can be accommodated by providing blocks of various sizes, or relatively wide slides can engage the rear edge of the aperture 51 directly.

To retain the specimen slide 49 in predetermined position on the holder so that it can be removed and inserted with the assurance that it will always be in engagement with the abutment (or said rear edge) and occupy the same relation thereto, the holder is provided with a vertical lateral stop or shoulder 56 which extends upwardly from one of the ledges 50 and against which an end of the slide is engageable.

The holder is provided with suitable resilient means which engage the opposite end of the slide in a manner to urge said other end of the slide against the stop 56. In the construction shown, said resilient means comprises a spring tongue or member 57 secured at one of its ends to a vertical face or shoulder 58 on the holder, and which has at its other end an upright offset portion 59 adapted to bear against the adjacent end of the slide 49. The upper end of the part 59 preferably overhangs the end of the slide to prevent upward movement of the slide away from the adjacent ledge 50. The tongue 57 is also provided with a laterally extending portion 60, which projects outwardly through a hole 61 in the side of the holder and terminates in a finger piece 62 by which the tongue 57 can be manipulated to move it away from the end of the slide 49 to permit its removal. The holder is also preferably provided adjacent the shoulder 56 with an overhanging retaining part 63 which extends close to the top face of the slide and acts to retain the same in engagement with the adjacent ledge 50.

For enabling the slide 49 to be easily and quickly placed in proper position with one of its ends extending beneath the part 63 and bearing against the shoulder 56, and with its rear side edge engaging the abutment 52, the aperture 51 is made sufficiently large to permit the ledges 50 to extend some distance forwardly of the front edge of the slide when the latter is in its operative position, and preferably the ledges 50 connect with upwardly inclined faces or portions 64 terminating at or merging into the top face 65 of the holder. Thus, the slide can be readily inserted into proper position on the holder by sliding it downwardly along the inclined portions or faces 64 and along the ledges 50 until the rear edge of the slide is arrested by abutment 52. During this movement the offset tongue 57 will be encountered by one end of the slide and said tongue 57 will, when the slide is released, securely hold the same against the abutment 52 and the stop shoulder 56.

Preferably, the holder 48 is movably mounted upon the top face of the plate 41 so that it can be adjusted transversely thereof, or in a direction crosswise of the plates 41 and 42. For this purpose, the plate 41 is provided with an upwardly extending, dove-tailed guide 70 which engages in a correspondingly undercut transverse groove 71 in the holder 48.

It will be noted, upon reference to Figs. 1 to 3, and 5, that the upper stage plate 41 is provided with an aperture 75, and the lower stage plate 42 with an aperture 76. The aperture 51 of the holder 48 is coincident with said apertures 75 and 76 in all relative positions of the stage parts to enable light to pass upwardly through the specimen slide from beneath the stage.

In order to effect the described longitudinal movements of the stage plates 41 and 42 and the transverse movements of the slide holder 48, the following mechanism is provided:

Journaled upon the primary support, and preferably in the decentering ring 26 thereof, is a horizontal shaft 78 which extends in a transverse direction relatively to the path of movement of the plate 42 in its guides.

The opposite ends of the shaft extend beyond said ring and are provided with operating knobs 79, for rotating the shaft. Rotatably mounted upon each end of the shaft and concentric therewith, is a sleeve 80 journaled and prevented from endwise movement in a stationary bearing 81 in said ring 26. The inner end of each sleeve is provided with a pinion 82 meshing with a rack 83 depending from the lower face of the plate 42 and extending lengthwise thereof. The outer ends of the sleeves are provided with operating knobs 84. By rotating either of the sleeves 81 the stage may be moved horizontally back and forth in its guides 45 to locate the specimen slide or other object on the holder 48 in desired relation to the objective 20, in one direction with relation to the instrument.

For shifting the specimen slide holder 48 in a crosswise direction as explained, the shaft 78 is provided with a fine screw thread extending from one of the pinions 82 to the other. This screw thread engages in a correspondingly threaded projection 85 formed on the rear end of a slide or member 86, which slidably engages upon the top face 27 of the primary support and is guided transversely thereof by the engagement of a depending, dove-tailed portion 87 on said slide in a correspondingly undercut groove or guideway 88 in the decentering ring 26 of said primary support. The slide holder 48 is provided with a depending lug or projection 90 which operatively engages the slide 86 in such a manner that transverse movements of the slide 86 in either direction is imparted to the holder 48 so that it be adjusted a corresponding distance along its transverse guide 70.

In the particular construction illustrated, the depending lug 90 of the holder 48 engages in a longitudinally extending groove 91 in said slide 86 formed by a pair of parallel, upwardly extending ribs or walls 92 on said slide. The opposite sides of the lug 90 fit against the corresponding inner faces of the groove 91 so that no lost motion is possible between these parts during the transverse adjustment of the slide holder. On the other hand, the groove 91 is of sufficient length to permit the lug 90 to travel lengthwise thereof in either direction during the longitudinal adjustment of the carriage, at the same time maintaining the slide holder in any transverse position to which it has been adjusted by the adjusting screw or shaft 78.

It will be noted that the ends of the screw portion of the shaft 78 engage the pinions 82 and, since the sleeves 80 on which these pinions are secured are prevented from endwise movement and are journaled in fixed bearings 81, both shaft and sleeves remain in the same relative position to the primary support at all times.

The plates 41 and 42 are both provided with transverse slots 93 through which the lug 90 extends into operative relation with its slide 86, and which slots are of sufficient length to permit any portion of the slide 49 to be adjusted transversely to a position beneath the objective 20. The longitudinal adjustment of the stage is sufficient to permit an extreme adjustment of the slide holder 48 from the extreme adjusted position shown in Fig. 5 in full lines, to either of the other extreme positions shown in broken lines in that figure.

It should be understood that in microscopes not not provided with decentering rings, or other similar laterally or rotatably adjustable members, the described adjusting means for effecting the longitudinal and transverse adjustments of the slide holder would be arranged or mounted directly upon the annular frame 25 or its equivalent.

The position and arrangement of the fine adjusting mechanism and the operative connections between the same and the stage, for effecting vertical adjustments of the specimen slide or object towards and from the objective 20, will now be described.

As seen particularly in Figs. 1, 8 and 9, the front of the base structure 10 is formed with a projection or housing 95 extending downwards from the frame 25, having therein a vertical guideway 96 in which a slide or part 97 of a secondary stage support 98 operatively engages for movement up and down therein. The upper end of the support 98 extends rearwardly and upwardly in the form of a bracket 99 and terminates in an annular attaching portion 100 formed with a horizontal, inwardly extending top flange 101 within which is a circular aperture 102.

Resting upon the top of the flange 101 is a horizontally disposed bearing plate or member 103 having a central, circular aperture 104, and extending about this aperture a depending annular shoulder 105 which extends through said aperture 102, and to which is secured, by screws or the like 106, a retaining ring 107. The ring 107 bears against the underside of the flange 101 of the secondary support 98 and retains the bearing plate in engagement with the top face of said portion 100. The diameter of the depending attaching portion 105 of the bearing plate 103 is sufficiently less than the diameter of the aperture 102 through which it extends to permit a limited lateral play of the bearing plate 103 in all directions in a horizontal plane relatively to the secondary support 98.

Two opposite edges of the bearing plate 103 are beveled as shown at 110, so as to slidably engage in a pair of fixed guides 111 depending from the stage plate or member 41. The lower face of the plate 41 engages the upper face of the bearing plate 103 so that said plate is retained thereby in horizontal position and in parallel relation thereto while permitting the necessary longitudinal adjustments of the stage relatively to the bearing plate 103 and primary support.

By connecting the plate 41 to the secondary stage support 98 through the bearing plate 103, the plate 41 may be moved vertically with said support and relatively to the plate 42 which is movably connected to the primary support, so as to adjust the specimen holder 48 towards and from the objective 20, while retaining the parts so moved in parallel planes. In other words the adjustment is affected by a movement of translation.

To enable the plate 41 to move in a vertical direction with regard to the plate 42, while at the same time retaining these plates operatively connected to each other during horizontal adjustments of the stage, a suitable connection is provided between them. In the construction illustrated, said plate 41 has depending from each side thereof a lug or bracket 112 to which the rear end of a longitudinally extending link 113 is connected by a horizontal transverse pivot 114. The forward end of each link is connected by a second transverse, horizontal pivot 15 to one side of the adjacent rack 83. By this construction the upper plate 41 and attached parts of the stage can be adjusted to any desired position between the extreme lower and upper adjustments shown in Figs. 1 and 14, and in Figs. 2 and 15 respectively.

The means for effecting the described adjustments of the slide 49 through movement of the secondary support can be of any usual or suitable construction, that shown preferably comprising a fine adjustment mechanism including a horizontally disposed, transverse shaft 115 journaled in a bearing sleeve 116 which is removably secured by screws or devices 117 in the upper end of a transverse recess or cavity 118 in the housing 95 of the base structure.

The shaft 115 extends beyond the opposite sides of said housing and is provided with an operating knob 118a on each end thereof. The shaft is prevented from endwise movement by an enlargement 119 which fits in a recess in the sleeve 116. Intermediate of its ends the sleeve 116 is provided with a cavity 120 through which the shaft 115 extends and within which it is provided with a fine screw thread 122 operatively engaging in a slidable nut or member 123. This nut 123 has a tongue extending into a slot 124 in the sleeve 116 as shown in Figs. 1 and 10 to permit it to travel lengthwise of the shaft without rotating thereon.

Projecting from a side of the nut 123 is a stud 126 against which one arm 127 of a bell crank lever 128 engages as shown in Fig. 8. The other end 129 of said lever extends beneath and is provided with a roller 130 engaging beneath a forwardly extending projection or shoulder 131 formed on or secured to the slide 97 of the stage support 98.

The bell crank lever 128 is mounted on a pivot 133 secured preferably in a removable block 134 or separate part of the housing 95, and which is rigidly secured in the lower part of the recess or cavity 118 before mentioned, by screws 135. The guideway 96 for the slide 97 of the secondary stage support 98 is also preferably formed in said block 134. As shown in Figs. 1 and 8, the slide 97 of the secondary stage support 98 is provided with a forwardly extending pin or projection 138 which extends across the lower, open end of a vertical recess 139 formed in said block 134. Between said pin 138 and the upper, closed end of the recess 139 is arranged a strong compression spring 140 which, reacting upon said pin, urges the support 98 in a downward direction. This causes the projection 129 to bear firmly upon the roller 130 of the lever arm 129, and the other arm 127 of said lever to bear firmly against the stud 126 of the fine adjusting mechanism, as shown in Fig. 8.

Therefore, any movement of the actuating nut 123 toward the left in Fig. 8 will swing the lever 128 in a direction to cause its arm 129 to elevate the secondary stage support 98 and, with it, the stage plate 41 and specimen holder 48. To cause a descent of these parts, the shaft 115 is turned in the opposite direction so that the projection 131 bearing upon the arm 129 of the lever 128, will cause the arm 127 of said lever to follow and remain in engagement with the stud 126, by reason of the weight of the parts to which the projection 131 is connected.

A pair of tension springs 142, having their upper ends connected to the stationary frame or ring 25, and their lower ends connected to the rearward extension 99 of the secondary stage support 98, act in assisting the spring 140 in counterbalancing the overhanging weight of the parts 99 and 100 of said support, and the stage supported thereon.

By the construction described, the stage member 41 and slide holder 48 can be elevated or lowered, relatively to the objective 20 and to the base structure of the instrument, in any position to which these parts have been adjusted either longitudinally or crosswise of the instrument, and conversely, the stage members 40 and 41 can be adjusted longitudinally and the slide holder 48 adjusted transversely while the adjustable stage parts are in either of the positions shown in Figs. 14 or 15, or in any of the intermediate positions between these two positions.

If no slide holder 48 is used, an object or specimen can, of course, be positioned directly upon the stage plate 41 and will be subject to the same adjustments as the holder 48.

The microscope can, if desired, be provided with any usual or suitable sub-stage for supporting a condenser beneath and in operative relation to the specimen slide or other object upon the stage. A condenser 145 is shown in the drawings as being mounted in a standard condenser unit 146 which, in turn, is removably secured in a horizontal fork 147. This fork is so disposed that the axis of the condenser 145 is approximately coincident with the optical axis of the objective 20. In order to bring the axis of the condenser 145 into exact register with the axis of the objective 20, one part of the condenser mounting 146 is adjustable radially relative to the part which engages in the fork 147, as by means of the usual adjusting screws 148a. After the condenser has been accurately centered, the adjustment is left undisturbed.

The fork 147 is fixed to an upright arm 148 of the sub-stage, and is provided with a vertical rack 149 engageable with a pinion 150 secured on a horizontal shaft 151. The shaft 151 is provided with an operating knob 152 for rotating the pinion. The shaft 151 is journaled in a vertical guide member 153 secured by screws or the like 154 to the secondary stage support 98. The arm 148 and the guide member 153 are provided with interfitting guide portions permitting the sub-stage to be adjusted to and fro in a vertical direction relatively to the support 98 by rotation of the pinion 150.

Preferably the arm 148 is divided in a vertical direction into two parts having slidable engagement one with the other under the control of a fine adjusting screw 155 in the usual manner for effecting a fine adjustment of the condenser.

Light may be concentrated upon and directed into the condenser by a mirror or reflector 156, movably supported upon a slide 157, which is adjustable vertically on a depending arm 158 secured to the bracket 99 of the secondary stage 98, and which extends downwardly therefrom through a hole in the substage arm 148, see Fig. 1.

It will be seen from the foregoing description that, after the condenser 145 has been moved into its operative relation to the specimen slide 49 by means of its coarse and fine adjusting mechanisms, it can be retained in this relation during any subsequent adjustments of a specimen toward and from the objective 20 by the fine adjusting mechanism, since the substage is mounted on and is movable with the secondary stage support 98. The substage is therefore not only movable with the secondary stage support 98 in the adjustments thereof, but is also adjustable independently thereof.

An important advantage attained by the provision of the floating bearing plate 103 is that the specimen 49 can be adjusted laterally with relation to the optical axis, without changing the relation of the substage and condenser to the objective 20 by adjusting the decentering ring 26. This manipulation is particularly useful in polarizing work, where it is often necessary to decenter a particular portion of the specimen with relation to the optical axis.

This lateral movement or adjustment will be effected through the floating connection between the bearing plate 103 and the flange 101 of the secondary stage support for which suitable clearance has been provided, as explained.

By constructing the microscope in the manner disclosed, several advantages over former instruments result, among which may be mentioned the convenience of the location of the operating knobs for the fine adjustment mechanism. These are so positioned that they may be manipulated while the hands of the user are resting upon the table or other support. Therefore a steady control of the fine adjustments is assured. Also the fact that the operating knobs 79 and 84 for the longitudinal and transverse adjustments respectively of the stage remain in the same position relative to the base structure during all such adjustments of the stage is of advantage, since the user can locate these knobs readily, without removing his eye from the eye piece or groping around to locate the knobs. A further important advantage and improvement resides in the way the stage members 41 and 42 are retained in parallelism with the secondary stage support during all adjustments of the stage towards and from the objective. This is due to the floating bearing plate 103 and the link connections between the plates 41 and 42 which permits the plate 41, the slide holder 48 when such is used, and the specimen, object, or slide upon the stage to be adjusted by a movement of translation. That is to say, any given point of an object or specimen on the stage will have the same velocity and will be moving in the same direction at any instant during such adjustments.

Therefore, a particular part of an object under observation through the objective will remain in the same relation to the latter, except in the matter of distance, and will present the same aspect thereto during all adjustments thereof as effected by the fine adjusting mechanism.

I claim as my invention:

1. In a microscope, a stationary arm, an objective adjustably mounted on said arm, a stage for supporting a specimen in operative relation to said objective, a base forming a stationary primary support, a secondary movable support mounted on said stationary base for supporting said stage, a substage also mounted on said secondary support and which is adjustable thereon relatively to said stage and arm towards and from said specimen, and fine adjusting mechanism on said stationary primary support which is arranged on a horizontal axis at one side of the axis of said objective for adjusting said secondary support with said stage and substage thereon as a unit towards and from said objective relatively to said stationary support and said stationary arm.

2. In a microscope, an objective, a stage for supporting a specimen in operative relation to said objective, a primary support, a secondary support for said stage means for resiliently mounting said secondary support on said primary support for yielding movement relative thereto, and means for adjusting said secondary support relative to said primary support and controlling the yielding movement thereof to shift said stage towards and from said objective by translational movement of said stage.

3. In a microscope, an objective, a stage for mounting a specimen in operative relation to said objective, a primary support, a secondary support movable relatively thereto upon which said stage is mounted, resilient means engaging said secondary support and which acts to yieldingly urge said secondary support and said stage relatively to said primary support in a direction away from said objective, other yielding means acting to urge said secondary support towards said objective and relative to said primary support, and adjusting mechanism on said primary support operatively connected to said secondary support for controlling the action of both of said resilient means and for adjusting said secondary support and said stage towards and from said objective to dispose said specimen in different positions relatively thereto.

4. In a microscope, a base, a stage including a lower member guided thereon to move in a straight horizontal path relatively thereto, an intermediate member superimposed upon said lower member and having a connection therewith such that it may travel horizontally therewith, and said connection also permitting said intermediate member to be shifted vertically towards and from said lower member by a movement of translation, an upper member guided on said intermediate member for horizontal movement crosswise of the path of travel of said lower member and which is adapted to support a specimen thereon, and fine adjusting means on said base for effecting said vertical adjustments of said intermediate member.

5. In a microscope, a base, a stage including a lower member guided thereon to move in a straight horizontal path relatively thereto, an intermediate member superimposed upon said lower member and having a connection therewith such that it may travel horizontally therewith, and a link connection between said members for permitting said intermediate member to shift vertically towards and from said lower member by a movement of translation, a support movable on said base in said vertical direction and to which said intermediate member is operatively connected, adjusting mechanism on said base for actuating said support, and an upper member mounted on said intermediate member and movable horizontally crosswise of the direction of travel of said intermediate and lower members and which is adapted to support a specimen thereon.

6. In a microscope, an objective, a primary support, a secondary support mounted thereon, a substage carried by said secondary support and having a condenser thereon, and means for adjusting the axis of said condenser to a position coincident with the axis of said objective, said primary support including a decentering member adjustably mounted so as to have a limited movement in directions crosswise of said axis, a stage for mounting a specimen in operative relation to said objective and having a part connected to said decentering member, and a second part movably connected to said first part and which also has a floating connection with said secondary support, whereby said decentering member and said stage may be moved as a unit to effect lateral adjustments of said specimen with respect to said objective without changing the relation of said condenser to said objective.

7. In a microscope, a primary support, a stage including a pair of superimposed members, one of which is guided on said primary support for movement in one direction to and fro relatively thereto, and the other of which is movable therewith, a specimen holder guided on said second member for movement crosswise of the direction of movement of said stage members, a secondary support on said base, a bearing plate having a floating connection therewith for enabling said plate to have lateral movements with respect thereto, and a guide connection between one of said stage members and said bearing plate which permits said stage to be adjusted relatively thereto.

8. In a microscope, a primary support, a stage upon which a specimen may be mounted, a secondary support on said primary support, a bearing plate upon which said stage is mounted, a rotatable connection between said bearing plate and said secondary support which permits said stage and said bearing plate to be rotated relatively to said secondary support for turning said specimen into different angular positions, and means on said primary support for effecting such rotary movements of said stage and bearing plate.

9. In a microscope, a holder for a specimen slide comprising a substantially flat, apertured member having ledges at two opposite sides of said aperture upon which the ends of said slide may rest, and which ledges are disposed in a plane parallel with and inwardly of a face of said member, inclined guide portions extending from said face and merging into said ledges so that said slide may be placed upon said face and moved therefrom across said inclined portions to and upon said ledges and means for releasably retaining said slide on said ledges.

10. In a microscope, the combination of a relatively large and stable base having a horizontal top portion with an aperture extending vertically through approximately the middle thereof, a stage for a specimen engageable upon said top portion and about said aperture, an objective arranged above said stage in line with the aperture in said base, and adjusting means on said base engageable with said stage through said aperture in said base for shifting said stage and specimen towards and from said objective by translational movements of said stage.

11. In a microscope, the combination of a relatively large and stable base having a horizontal top portion with an aperture extending vertically through approximately the middle thereof, a stage for a specimen engageable upon said top portion and about said aperture, an objective arranged above said stage in line with the aperture in said base, a support for said stage movably mounted in said base engaging said stage through the aperture in said base and which is operative to shift said stage towards and from said objective along the axis thereof, a substage also mounted on said support and which is adjustable relatively thereto towards and from said specimen and said objective, and adjusting means on said base for shifting said support, said stage, said substage, and specimen as a unit towards and from said objective and relatively to said base.

12. In a microscope, the combination of a relatively large and stable base having a horizontal top portion with an aperture extending vertically through approximately the middle thereof, a horizontal ring operatively connected directly to said top of said base for rotary movement about the axis of said aperture, a stage for a specimen engageable upon and rotatable with said ring and which extends about said aperture, an objective arranged above said stage in line with said aperture in said base, a support on and vertically movable relatively to said base and which engages with said stage through said aperture and ring for shifting said stage towards and from said objective and relatively to said base and ring, an operative connection between said support and said stage by which said stage may rotate with said ring and relatively to said support, and means for effecting the movement of said support.

13. In a microscope, a relatively large specimen stage having adjustable members for placing a specimen in different positions relatively to an objective disposed above said stage, a stable base of relatively great horizontal dimensions and upon which said stage engages and moves, an arm extending upwardly from a side of said base remote from the user for supporting said objective and having thereon adjustment means for moving said objective axially towards and from said specimen, adjusting means located on said base at the opposite side of said base and conveniently close to the user and which is operatively connected to said stage for shifting the same and said specimen toward and from said objective by translational movements of said stage.

14. In a microscope a stable base having relatively great horizontal dimensions and which is apertured vertically approximately at the middle thereof, an objective disposed above said base with its axis passing through said aperture, a specimen stage arranged on said base over said aperture, an arm extending upwardly from a side of said base remote from the user for supporting said objective and having thereon adjustment means for moving said objective axially towards and from said specimen, adjusting mechanism located on said base at the opposite side thereof and conveniently close to the user and laterally disposed with respect to the axis of said objective, and an operative connection extending from said adjusting mechanism through said base aperture to said stage for shifting the latter and said specimen towards and from said objective by translational movement of said stage.

HARVEY N. OTT.